(12) United States Patent
Garcia Luna et al.

(10) Patent No.: US 7,169,225 B2
(45) Date of Patent: Jan. 30, 2007

(54) ANHYDRITE CEMENT COMPOSITIONS AND PROCEDURES FOR MANUFACTURE

(75) Inventors: Armando Garcia Luna, Monterrey (MX); Jaime Valenzuela Grado, Chihuahua (MX); Perla Elvia Garcia Casillas, Chihuahua (MX); Pedro Burciaga Melendez, Chihuahua (MX)

(73) Assignee: Grupo Cementos de Chihuaua S.A. de C.V., Chihuahua (MX)

( * ) Notice: Subject to any disclaimer, the term of this patent is extended or adjusted under 35 U.S.C. 154(b) by 0 days.

(21) Appl. No.: 10/854,631

(22) Filed: May 27, 2004

(65) Prior Publication Data

US 2005/0115468 A1    Jun. 2, 2005

(30) Foreign Application Priority Data

Dec. 2, 2003    (MX) .................. PA/A/2003/011064

(51) Int. Cl.
*C04B 7/00*     (2006.01)
*C04B 14/00*    (2006.01)
*C04B 28/04*    (2006.01)

(52) U.S. Cl. ...................................... 106/735; 106/772
(58) Field of Classification Search ............... 106/735, 106/772
See application file for complete search history.

(56) References Cited

U.S. PATENT DOCUMENTS

| | | | |
|---|---|---|---|
| 3,155,526 A | | 11/1964 | Klein |
| 3,628,973 A | * | 12/1971 | Greening et al. ............ 106/734 |
| 3,819,389 A | * | 6/1974 | Uchikawa et al. .......... 106/734 |
| 3,856,540 A | * | 12/1974 | Mizunuma et al. ......... 106/705 |
| 3,857,714 A | * | 12/1974 | Mehta ........................ 106/735 |
| 3,860,433 A | * | 1/1975 | Ost et al. .................... 106/765 |
| 3,915,734 A | * | 10/1975 | Kokuta et al. .............. 106/695 |
| 3,947,284 A | * | 3/1976 | Kitsugi et al. .............. 106/662 |
| 4,350,533 A | | 9/1982 | Galer et al. |
| 4,488,909 A | * | 12/1984 | Galer et al. ................. 106/695 |
| 4,494,990 A | | 1/1985 | Harris |
| 4,661,159 A | | 4/1987 | Ortega et al. |
| 5,356,472 A | * | 10/1994 | Odler ......................... 106/734 |
| 5,454,866 A | * | 10/1995 | Gilbert et al. .............. 106/695 |
| 5,685,903 A | | 11/1997 | Stav et al. |
| 5,785,751 A | * | 7/1998 | Bashlykov et al. ......... 106/725 |
| 5,788,762 A | | 8/1998 | Barger et al. |
| 5,958,131 A | | 9/1999 | Asbridge et al. |
| 6,033,468 A | | 3/2000 | Folks et al. |

FOREIGN PATENT DOCUMENTS

| | | |
|---|---|---|
| DE | 3414135 A1 | 10/1985 |
| EP | 0725044 A1 | 8/1996 |
| EP | 0990627 A1 | 4/2000 |
| GB | 374455 A1 | 6/1932 |
| GB | 1498057 B1 | 1/1978 |
| MX | 0003021 A | 8/2000 |
| SU | 1754690 A1 | 8/1992 |

OTHER PUBLICATIONS

American Chemical Society, vol. 106 No. 16. Apr. 20, 1987 p. 342 XP000187363.
American Chemical Society. Dec. 24, 1984. XP000189070.
P.E. Halstead et al., *The Composition and Crystallography of an Anhydrous Calcium Aluminosulphate Occurring in Expanding Cement*, J. appl. Chem., Sep. 1962, pp. 413-417, (12).

* cited by examiner

*Primary Examiner*—Elizabeth D. Wood
(74) *Attorney, Agent, or Firm*—Rothwell, Figg, Ernst & Manbeck, P.C.

(57) ABSTRACT

The present invention describes improved anhydrite cementitious compositions that control or avoid ettringite formation, as well as procedures for manufacture. These compositions exhibit good compression resistance in early stages, good resistance to abrasion and good behavior under water.

27 Claims, 11 Drawing Sheets

FIGURE 6

| | COMPONENTS | AMOUNT | METHOD |
|---|---|---|---|
| CHEMICAL COMPOSITION | Fluor [%] | 0 - 4 | Gravimetric Method |
| | $K_2O$ [%] | 0.0 - 0.05 | ASTM-C114 |
| | $Na_2O$ [%] | 0.3 | ASTM-C114 |
| | $SiO_2$ [%] | 0 - 2 | ASTM-C114 |
| | $Al_2O_3 + Fe_2O_3$ [%] | 0 - 1.5 | ASTM-C114 |
| | CaO [%] | 35 - 45 | ASTM-C114 |
| | MgO [%] | 0.4 - 0.6 | ASTM-C114 |
| | $SO_3$ [%] | 51 - 56 | ASTM-C114 |
| | Hemi-hydrated plaster [%] | 0 - 10 | Termogravimetric Analysis |
| | Di-hydrated plaster [%] | 0 - 3 | Termogravimetric Analysis |
| PHYSICAL PROPERTIES | pH | 2 - 4 | ASTM-D4972 |

FIGURE 7

| COMPONENTS | AMOUNT | METHOD |
|---|---|---|
| Tricalcium silicate [%] | 59-61 | ASTM C150 |
| Tricalcium aluminate [%] | 10 maximum | ASTM C150 |
| Free lime [%] | 1.0 maximum | ASTM C114 |
| Density (g/l) | 1050-1300 | ASTM D4892 |

FIGURE 8

| COMPONENTS | AMOUNT | METHOD |
|---|---|---|
| $SiO_2$ [%] | 8 - 11 | ASTM-C114 |
| $Al_2O_3$ [%] | 0 - 3 | ASTM-C114 |
| $Fe_2O_3$ [%] | 0 - 1.5 | ASTM-C114 |
| CaO [%] | 48 - 60 | ASTM-C114 |
| MgO [%] | 0 - 1.3 | ASTM-C114 |
| $K_2O$ [%] | 0 - 0.5 | ASTM-C114 |
| $Na_2O$ [%] | 0 - 0.2 | ASTM-C114 |
| $SO_3$ [%] | 30 – 40 | ASTM-C114 |
| Free lime [%] | 0 - 2 | ASTM-C114 |
| PPI [%] | 0.2 | ASTM-C114 |
| Mesh 325 [%] | $\geq 80$ | ASTM-C430 |
| Blaine (g/cm$^2$) | $\geq 5000$ | ASTM-C204 |
| Initial time of setting (min) | 20 - 25 | ASTM-C191 |
| Final time of setting (min) | 48 - 55 | ASTM-C191 |
| Resistance 24 hrs. (kg/cm$^2$) | $\geq 85$ | ASTM-C109 |
| Resistance 3 days (kg/cm$^2$) | $\geq 135$ | ASTM-C109 |
| Resistance 7 days (kg/cm$^2$) | $\geq 180$ | ASTM-C109 |
| Resistance 28 days (kg/cm$^2$) | $\geq 250$ | ASTM-C109 |
| Expansion in autoclave [%] | $\geq 0.03$ | ASTM-C151 |

FIGURE 11

| Sample | | Initial Time of Setting Vicat (min.) | Final Time of Setting Vicat (min.) |
|---|---|---|---|
| Portland Cement | 1 | 140 | 260 |
| | 2 | 138 | 265 |
| | 3 | 142 | 266 |
| | 4 | 138 | 260 |
| | 5 | 143 | 268 |
| Mixture 25/75 | 1 | 19 | 54 |
| | 2 | 19 | 46 |
| | 3 | 21 | 56 |
| | 4 | 22 | 62 |
| | 5 | 18 | 48 |
| Mixture 30/70 | 1 | 28 | 72 |
| | 2 | 25 | 69 |
| | 3 | 23 | 68 |
| | 4 | 27 | 67 |
| | 5 | 27 | 65 |
| Mixture 40/60 | 1 | 35 | 77 |
| | 2 | 34 | 71 |
| | 3 | 33 | 69 |
| | 4 | 33 | 73 |
| | 5 | 34 | 70 |

FIGURE 12

| COMPONENTS | SPECIFICATION MIXTURE 25/75 | SPECIFICATION MIXTURE 30/70 | Method |
|---|---|---|---|
| $SiO_2$ (%) | 3 - 6 | 5 – 8 | ASTM-C114 |
| $Al_2O_3$ (%) | 0 – 2 | 0 - 2 | ASTM-C114 |
| $Fe_2O_3$ (%) | 0 – 2 | 0 - 2 | ASTM-C114 |
| CaO (%) | 31 – 47 | 40 – 48 | ASTM-C114 |
| MgO (%) | 0 - 2 | 0 - 2 | ASTM-C114 |
| $K_2O$ (%) | 0 - 1 | 0 - 1 | ASTM-C114 |
| $Na_2O$ (%) | 0 – 0.3 | 0 – 0.3 | ASTM-C114 |
| $SO_3$ (%) | 40 – 48 | 38 - 44 | ASTM-C114 |
| % Free lime (%) | $\geq 2$ | $\geq 2$ | ASTM-C114 |
| Initial time of setting (min) | 16-24 | 23-30 | ASTM-C191 |
| Final time of setting (min) | 46-62 | 65-72 | ASTM-C191 |
| Resistance 24 hrs. (kg/cm$^2$) | 35-40 | 43-49 | ASTM-C109 |
| Resistance 3 days (kg/cm$^2$) | 100-115 | 115-130 | ASTM-C109 |
| Resistance 7 days (kg/cm$^2$) | 135-145 | 146-152 | ASTM-C109 |
| Resistance 28 days (kg/cm$^2$) | 170-180 | 178-190 | ASTM-C109 |

ANHYDRITE CEMENT COMPOSITIONS AND PROCEDURES FOR MANUFACTURE

BACKGROUND OF THE INVENTION

1. Field of the Invention

The present invention is related to construction field, specifically to the development of improved cementitious compositions as well as to the methods applied for the obtention.

2. Description of the Related Art

Portland cement is the main cement material of construction sector. It is the main element of union in concrete blocks, recovering for carpet tiles for floors, grout, wood fiber panels, mortars, glues for tiles, etc. In spite of its great applicability in construction field, Portland cement has some important disadvantages including low resistance to early compression force and a high contraction by drying; due to these circumstances, great efforts have been directed for the obtention of cementitious compositions with greater advantages than Portland cement allowing superior versatility in their applications.

Portland cement consists mainly of tricalcium silicate $((CaO)_3\ SiO_2)$ with small amounts of dicalcium silicate $((CaO)_2\ SiO_2)$, and it is obtained by burn from a stone mixture of calcium oxide and argillaceous material; due to the argillaceous component, Portland cement contains from 5 to 13% of tricalcium aluminate $((CaO)_3\ Al_2O_3)$. When this component is present in superior amounts, it causes an excessively fast setting of concrete or mortars, which is a problem when it is needed to transport from the mixed site to the place of its application. To avoid this effect of express setting, the calcium sulphate inclusion is well-known $(CaSO_4)$ using plaster in cement by the joint milling with Portland clinker.

However, the calcium sulphate presence causes two important undesirable effects in cement compositions. One of them is the plaster of Paris formation, which is occurring by the partial dehydration of plaster by the heat generated during the milling process (formula 1):

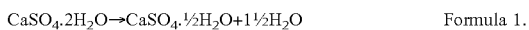

$CaSO_4.2H_2O \rightarrow CaSO_4.½H_2O + 1½H_2O$      Formula 1.

This component hardens the mixture and interferes with handling operations such as transportation, packing and concrete appearance.

Although it has been described that hydrated mixtures of hemi-hydrate calcium sulphate and Portland cement can be beneficial by its use in cement compositions[1], it has been observed chemical reactions between sulphate ions (provided mainly by calcium sulphate) and aluminum compositions contained in the hydrated Portland cement, generating a crystalline calcium sulfoaluminate hydrate of great volume called ettringite[2,3] $(3CaO.Al_2O_3.CaSO_4.32H_2O)$. Ettringite results from the reaction of hydration of tricalcium aluminate present in Portland cement with sulphate (see formula 2), which increases the volume of concrete, causing its breaking, cracking and crushing by the increase of expansive forces present in cement. At this time, ettringite is considered as an important factor in concrete deterioration in medium and long term.

$(CaO)_3Al_2O_3 + CaSO_4 +$
        $32H_2O \rightarrow 3CaO.Al_2O_3.CaSO_4.32H_2O$      Formula 2.

Although mixtures of Portland cement and calcined plaster have been used previously and in some cases they have been advantageous, interaction between tricalcium aluminate and sulphate forming ettringite has limited greatly the use of such mixtures. For example, the attempts to improve the resistance to water in plaster boards mixing Portland cement and calcined plaster have been of limited success due to ettringite formation. Due to these circumstances, plaster and Portland cement mixtures have been directed mainly as "fast solutions", that are known of poor durability in the long term.

The formation of ettringite in Portland cements with a high content of tricalcium aluminate may cause severe problems, which needs higher proportions of plaster to delay this effect.

Multiple developments have been centered in inhibiting or controlling the formation of plaster of Paris and/or ettringite in cement compositions, such as those in which the amount of tricalcium aluminate is varied[4] those were the type of present components prevent the ettringite formation[5,6] and those in where diverse types of calcium sulphate are mixed with other components[1,7]. In general, with these developments, compositions have been obtained and those can be used with water or another component to produce fluid mixtures, with a less demand of water, greater initial compression force resistance and low alkali functionality[8].

Nevertheless these compositions have a series of disadvantages, as much in their procedures for manufacture as in their characteristics, such as:

a) High cost,
    b) Low resistance to compression force,
    c) Longer times of setting,
    d) Resistance to early compression forces comparable to those of ordinary Portland cements, and
    e) The inclusion of greater number of elements in the composition, which makes difficult to obtain homogenous mixtures and increases the amount of energy used for its milling.

Due to these circumstances, the development of cheaper cementitious compositions is convenient, getting similar chemical and physical characteristics of Portland cement, including a suitable resistance to final compression force and a lower susceptibility to crack and crumble. Also it's desirable that improved compositions manage or eliminate ettringite formation, improving resistance to compression force.

SUMMARY OF THE INVENTION

It's an objective of present invention to provide improved cementitious compositions with Portland clinker and anhydrous calcium sulphate (anhydrite).

It's another objective of present invention to provide cementitious compositions based on anhydrite that control or eliminate ettringite formation.

It's another objective of present invention to obtain non-toxic cementitious compositions to atmosphere and alive beings.

It's also another objective of present invention to provide not expensive cementitious compositions, with good resistance to compression force, to abrasion and with good behavior under water or of excellent hydraulic properties.

An additional objective of present invention is to provide a simple method of low energy consumption for the obtention of cementitious compositions based on anhydrite.

Another one of the objectives of present invention is to provide a simplified method of proper homogenization of the components that form the cementitious compositions based on anhydrite.

The present invention provides cementitious compositions based on anhydrous calcium sulphate that control or avoid the problem of undesirable formation of ettringite and with similar characteristics to those of Portland cement.

The cementitious compositions of the invention are constituted of a mixture of Portland cement and anhydrous calcium sulphate or of clinker and anhydrous calcium sulphate, this last one provided to the mixture, on both cases, in anhydrous plaster or anhydrite form. Portland cement and anhydrite are in a proportion from 15 to 85% in weight with relation to the total weight of the cement composition.

The cementitious compositions of the invention do not present high levels of acidity, are not toxic, do not need to be activated with $K_2SO_4$ and its low aluminum concentration eliminates the risk of contamination in its application and in its handling.

The cement compositions of the present invention are distinguished to have similar physical properties to those of Portland cement, good resistance to compression force mainly to early stages, good resistance to abrasion and good behavior under water, at the same time they are not expensive cementitious.

Also with the mentioned cementitious compositions settled results with specifications ASTM are obtained, such as norms ASTM C-1038 (mixture of mortar submerged in water) and ASTM C-1012 (mixture of mortar submerged in sulphate solution).

The compositions of the invention are obtained by milling processes and joint mixing of clinker or Portland cement and thick anhydrite material, while the fine anhydrite material is sent directly to the finished product. With the process of the invention the separate milling of each one of the components and later mixed is avoided. Also homogenous cementitious mixtures are obtained, with a mesh finess of 325 almost in the totality of the end product.

BRIEF DESCRIPTIONS OF THE DRAWINGS

Figure 5:
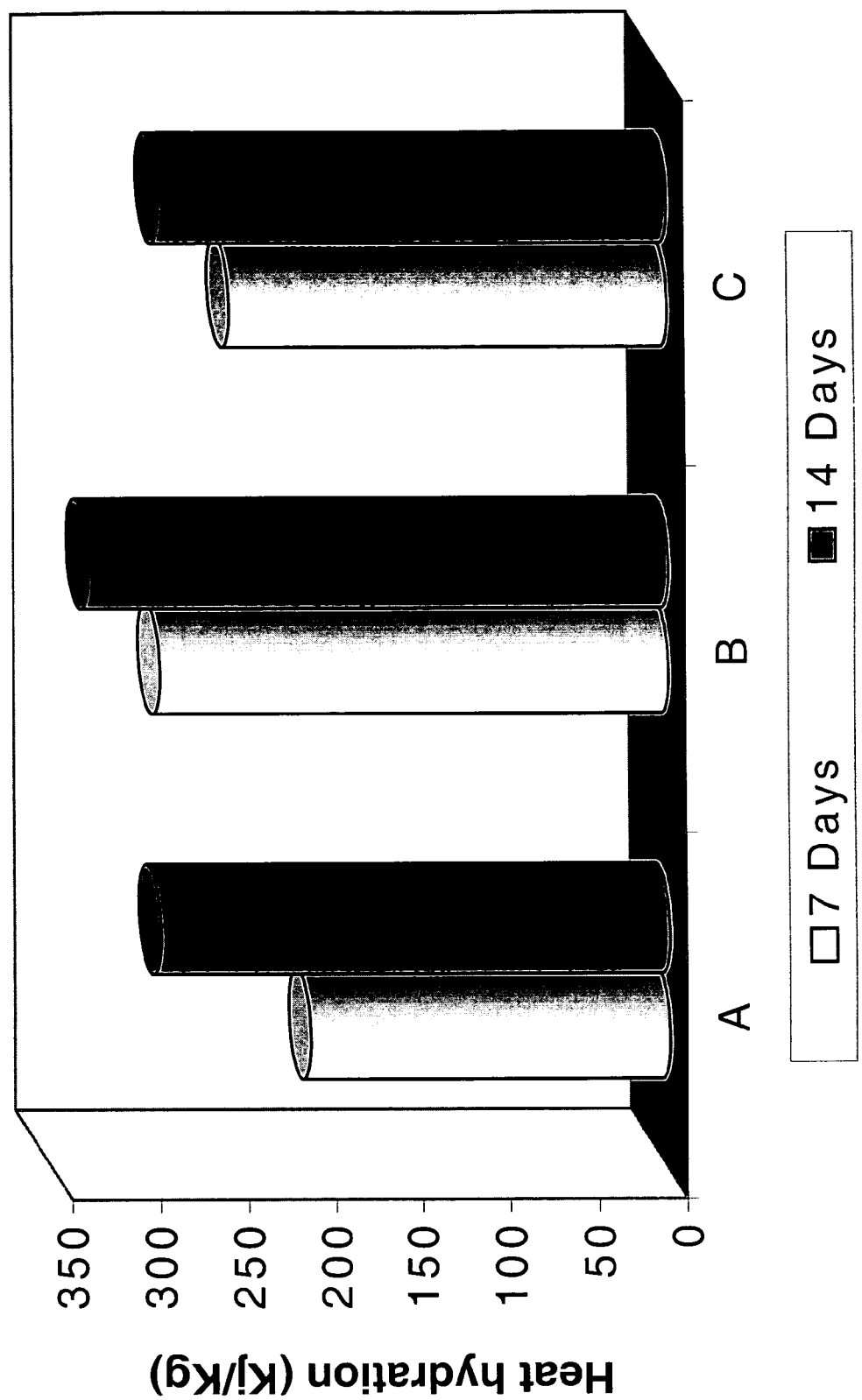

FIG. 5 is a comparative graph of heat hydration (ASTM C-595) among cementitious mixture 40:60 of the invention (A) and Portland cement type 11 (B) and type IV (C) to 7 and 14 days.

FIG. 6 show the physical-chemical characteristics of anhydrous plaster as raw material.

FIG. 7 show the physical-chemical characteristics of Portland clinker as raw material.

FIG. 8 show the physical-chemical characteristics of cementitious mixture 40:60 of the invention.

Figure 9:
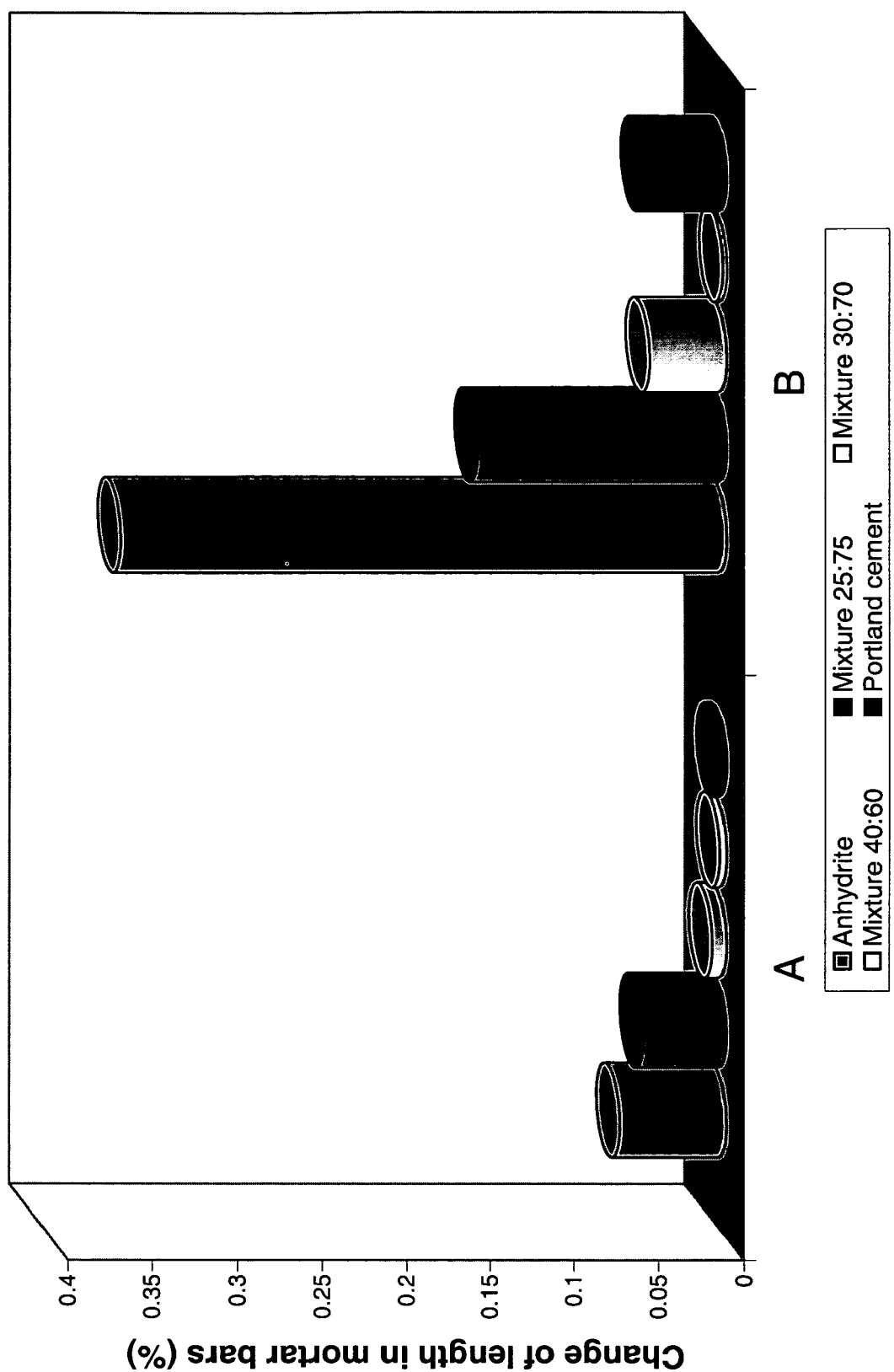

FIG. 9 is a comparative graph of percent length change in bars of mortar (ASTM C-1038) of 7 days (A) and 14 days (B) between the compositions of the invention, anhydrite and Portland cement.

Figure 10:
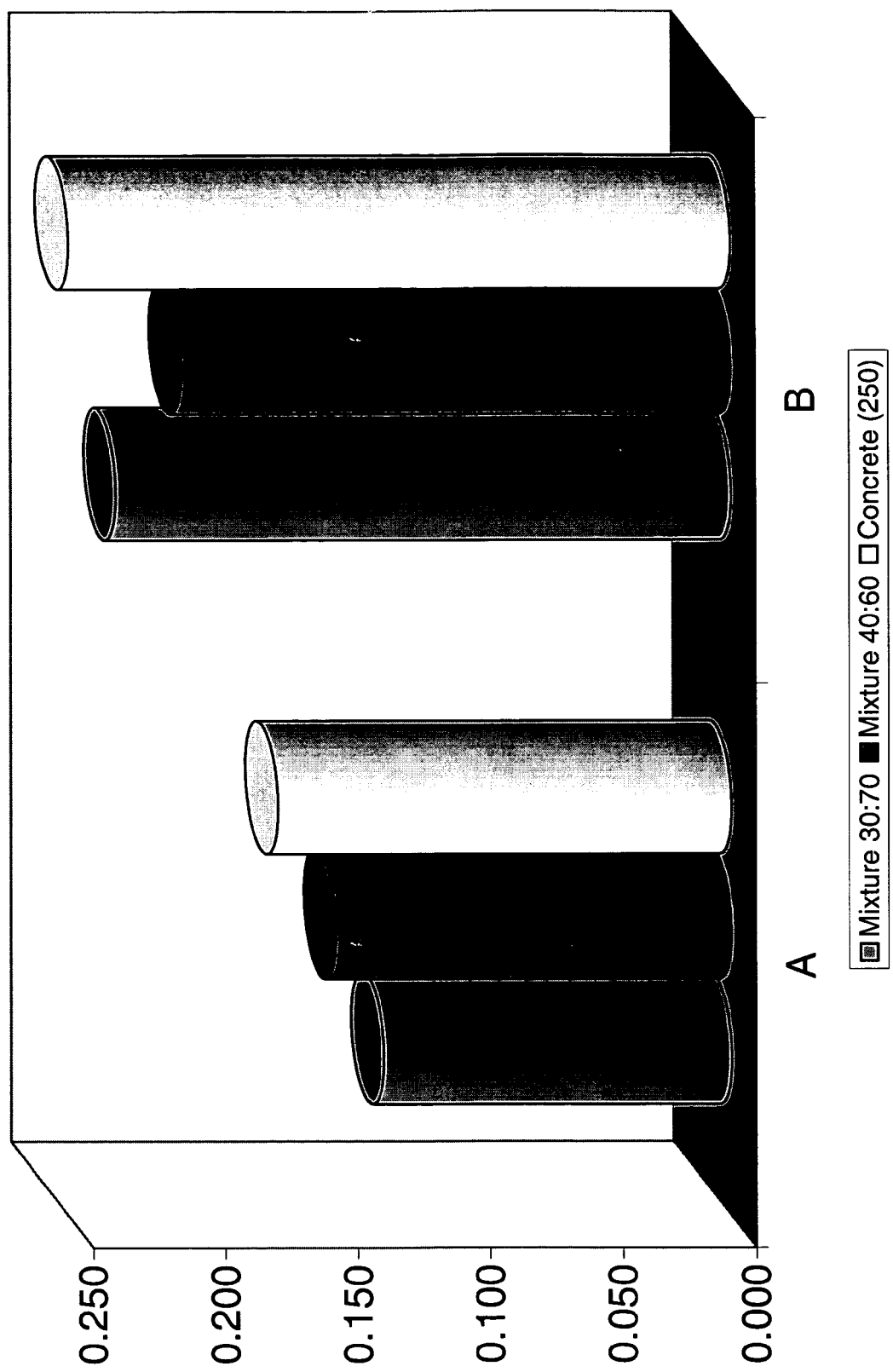

FIG. 10 is a comparative graph of thickness deterioration among mixtures 30:70, 40:60 and concrete 250 (A) and the percentage of deterioration (B) in a test of abrasion resistance.

FIG. 11 show the results of setting time in 5 samples, from the compositions of the invention in comparison with results observed for Portland cement.

FIG. 12 show the physical-chemical characteristics of the cementitious mixtures 25:75 and 30:70 of the invention.

DETAILED DESCRIPTION OF THE INVENTION

The present invention provides cementitious compositions based on anhydrous calcium sulphate that control or avoid undesirable formation of ettringite.

At present time cementitious compositions based on Portland cement mixtures and plaster are not common due to ettringite formation; due to it, the plaster dosifications for this type of mixtures have been restricted by norm ASTM C-150. The present invention solves the problem of the uncontrolled formation of ettringite in this type of mixtures and generates cementitious compositions with similar characteristics to those of Portland cement.

For the aims of the present invention, the cementitious compositions described here are constituted of a mixture of Portland cement and anhydrous calcium sulphate or clinker and anhydrous calcium sulphate, this last one provided to the mixture, in both cases, as anhydrous plaster or anhydrite. The anhydrite is obtained as a remainder product in the industrial production of fluorhydric acid and/or phosphorus pentoxide, either as result to burn plaster to a temperature between 600° C. and 1200° C. or like natural anhydrite. This remainder product, until the present invention, was not extensive used as main raw material for the obtention of cementitious, reason why its availability as a cheap source of anhydrous calcium sulphate is immediate, in comparison with conventional methods of synthetic anhydrite obtention in which the calorific and mechanical energy applied for its obtention is quite considerable, increasing costs of this raw material. With respect to Portland cement, ordinary cement type-1 (T1) can be used, also the type-3 and type-4, or preferably those in which the amount of tricalcium aluminate has been controlled, being these resistant to sulphate attacks; so this is the case of cements type-2 (T2) and type-5 (T5) which have moderate and high resistance to sulphate respectively; also mixtures of the mentioned Portland cements can be used.

For the obtention of the cementitious compositions of the present invention, the amount of aluminate in the used raw materials must be in a rank from the 0 to 15% in weight respect to the total weight of the mixture, preferably from the 5 to 13% in weight, although more preferably from 8 to 10% in weight. Respect to the amount of sulphate, this must be present in a rank from the 45 to 90% in weight and preferably from the 70 to 80%.

With respect to hemi-hydrate calcium sulphate, it must be in a rank from 0 to 8% in weight respect to the total weight of the mixture, preferably from 2 to 8% in weight, although more preferably from 5 to 7% in weight. Finally the amounts of di-hydrate calcium sulphate must oscillate in a rank from the 0 to 4% in weight respect to the total weight of the mixture, preferably from 1 to 3% in weight, although more preferably from 1 to 2% in weight.

The proportions of components in the cementitious compositions of the present invention are included between 15 to 85% in weight of anhydrite and 15 to 85% in weight of Portland cement in relation with the total weight of the cementitious composition. In one of the preferred modalities of the invention, the components are in a proportion from 25 to 75% in weight of anhydrite and 25 to 75% in weight of Portland cement; the cement compositions are preferred in where the components of the mixture are in proportions from the 40 to 75% of anhydrite and from the 25 to 60% in weight of Portland cement, but the most preferred are those in which the anhydrite is in a proportion in weight from the 60 to 75% and the Portland cement in a proportion in weight from the 25 to 40%.

Also the compositions of the present invention contain at most, percentages of, 4% of alumina, 60% of CaO and 40% of sulphates; with it, these compositions do not present high levels of acidity as the anhydrites naturally present been obtained as sub products, and they eliminate the inclusion of elements considered toxics. That's why, such compositions are not toxic and eliminate the contamination risk in comparison with other compositions with high concentrations of aluminum and/or acids. On the other hand, and as result of the conforming elements, the cementitious compositions of the invention do not need to be activated with $K_2SO_4$ or similar compositions, procedure that is common and necessary to make for other types of cementitious compositions. In relation to this, the company Industrial Química de Mexico reported an anhydrous potassium sulphate mixture with anhydrite to improve the quality of construction materials[9].

The known procedures of milling and joint mixing until now between plaster and another element, that may be Portland clinker to obtain a homogenous mixture of these components, imply an important number of difficulties in terms of milling. In this sense, the plaster in such mixtures tends and is propense to adhere to the equipment in such a way the wished fineness by the mill is not obtained easily; for example this material is very propense to cover the ball of the industrial mill. The high fineness demanded for the homogenous distribution of plaster in mixtures containing it, is necessary for certain types of cement and it can be obtained only with great difficulties.

Unlike such methods, the present invention provides a method of simple obtention of the described cementitious compositions that implies milling and joint mixing of clinker and thick anhydrite material, whereas the fine anhydrite material is sent directly to the finished product. Within the process of milling and mixing of the present invention, anhydrite as raw material is obtained as remainder product in the fluorhydric acid production. Later the anhydrite is fed directly to the separator of particles on the mill, classifying fine and thick anhydrite material. While the thick anhydrite material returns to direct feeding along with Portland cement for its milling, the fine ones of anhydrite are sent directly to the finished product, obtaining as minimum a mesh finess of 325 of the product in a 99%. This process allows the obtention of homogenous cementitious mixtures with anhydrite with a convenient distribution of particle sizes and avoids the separate milling of each one of the components and later mixed, eliminating therefore the costs that can represent the installation in plant of a mixer and homogenizer. Also the cementitious that is obtained by this process of milling and joint mixing, is more uniform than the one that is possible to be reached mixing separately the materials. On the other hand and immediately after its obtention, clinker can be mixing and milling directly with the anhydrite thick material increasing with it the efficiency in the obtention of the finished product.

As an option and during the milling process of the invention, a milling additive can be added to raw materials from the group that consists of the cement additive HEA-[2], sold under the trademark Darex by W.R. Grace & Co., the additive RI-77AA, sold under the trademark Roah by ROAN Industries, Inc., triethanolamine or propylene glycol in a proportion from 0 to 0.5% in weight with respect to the total weight of the mixture to obtain the cementitious compositions of the invention. HEA-2 is an amine acetate salt and RI-77AA is an additive consisting of ethylene glycol, acetic acid, triethanolamine and diethanolamine.

With the purpose of obtaining mixed and more homogenous milling, Portland cement is provided as clinker, although other forms that allow an intimate interaction with anhydrite can be used.

In the obtention process of calcium sulphate clinkers, described by Mehta[10], is necessary the use of expansive clinker with an excess of calcium sulphate (calcium sulfoaluminate, for example) superior to the required to form ettringite, which is included in Portland cement, preferably mixing jointly expansive clinker and Portland clinker. Also it is described that the materials are preferably milling altogether to a mesh finess of 200 and they are exposed later to a temperature of 1100 to 1300° C., generating clinker that it's possible then to mill until a mesh finess of 325 in a 70%. In this one case the control of temperature is important, since temperatures greater than the specified cause the excessive decomposition of calcium sulphate.

Contrasting the process described by Mehta, the process of the present invention is simpler and it does not expose the mixture of Portland clinker and anhydrite to high temperatures, avoiding with it the unnecessary use of energy and the possible undesirable transformation of the components of the mixture, altering with it its physical properties. Also the fineness that is obtained is more convenient in higher percentage (99%), which allows a better handling of the product, as much in its transport as in its mix with other elements for the formation of concrete or mortars.

According with the invention, it's advantageous to proceed obtaining a milling fineness of the mixture of at least 325 mesh or finenesses to allow a greater interaction between its components, affecting the physical properties of the mixture.

The present invention provides convenient cementitious compositions for its use in construction materials, for example in cement materials that contain plaster for concrete of express setting (for example in 24 hrs.), concrete of diverse types like for example, concrete for patios, mortars, blocks, bricks, asphalt patching materials, sidewalks, materials for parking places and streets including those of low traffic, bases for highways, materials for the asphalt industry, supporting boards, panels including those of wood fibers, tile covering, prefabricated pieces and other related applications.

Due to the characteristics of the compositions of the invention, these can be used in applications in which water resistance, good superficial finish and a fast increase in compression force to early stages, are important requirements.

As a way to illustrate the present invention, the following examples appear, without it limits the reach of the invention.

EXAMPLE 1

Obtention of Anhydrous Plaster

Anhydrous plaster as remainder product from the process of fluorhydric acid obtention (HF) was used, being transported by trucks to the plant for its milling. When the material arrived, took a sample for analysis, which results are in FIG. 6.

EXAMPLE 2

Obtention of Portland Clinker

Portland Clinker was produced based on known methods in industry, basically warming up a mixture of limestone and argillaceous material to greater temperatures of 1400° C. Later to its obtention in industrial oven, clinker was received in trucks and deposited in a clean and dry storage area avoiding outdoor placement. Later a sample for chemical analysis and quality control was taken, before feeding it to the process of the invention. The physical-chemical characteristics of used clinker are described in FIG. 7.

EXAMPLE 3

Milling and Storage of the Cementitious of the Invention

Figure 1:
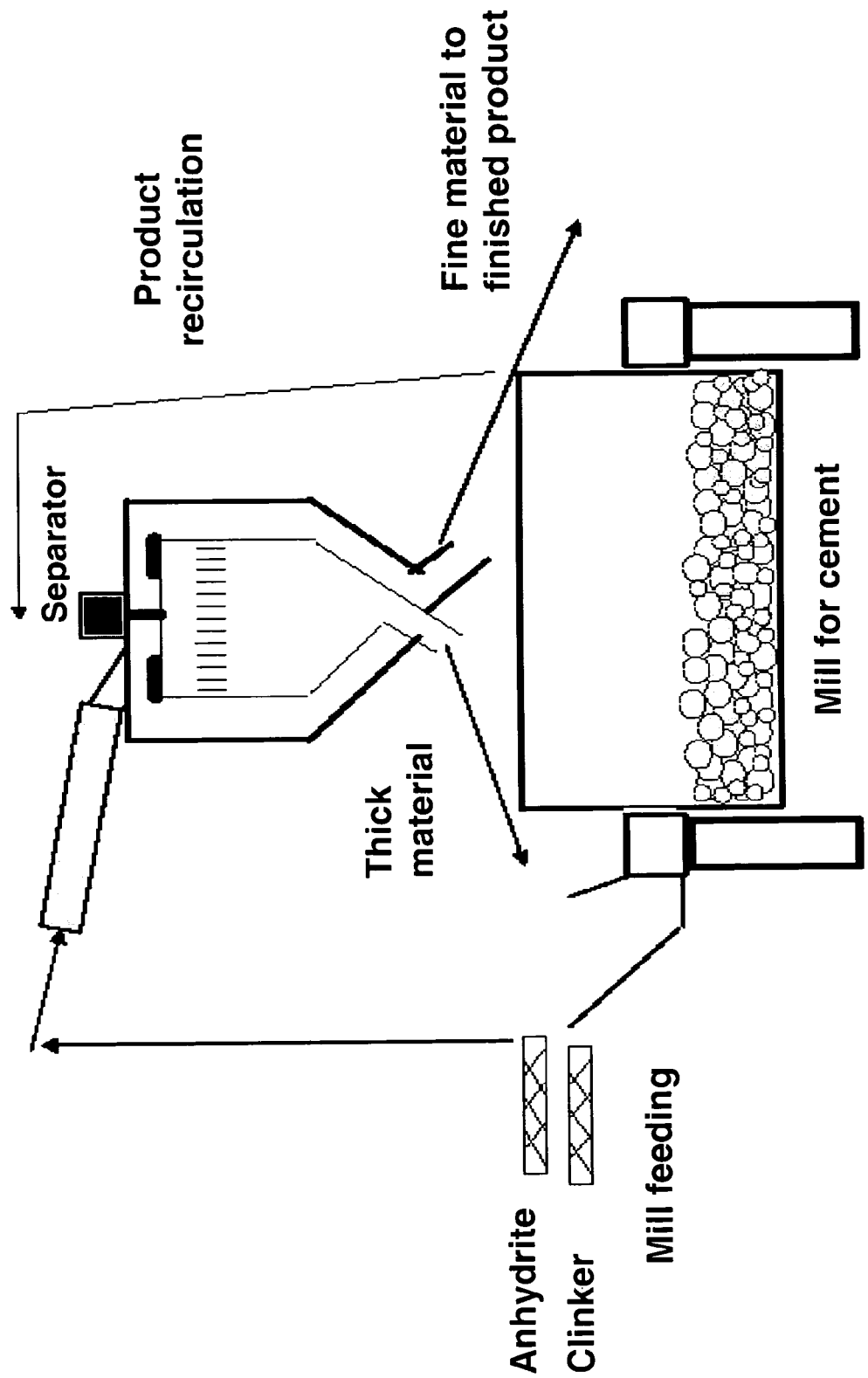
FIG. 1 is a scheme of milling process for the obtention of cementitious compositions in the present invention.

Portland Clinker and anhydrous plaster were fed to an industrial mill, equipped with a fine separator, as in FIG. 1. Raw materials were taken from the storage areas, to fill the mill hoppers, which were perfectly clean.

The anhydrous plaster (3) was fed directly to the fines separator (1) on the mill, with it, the obtained thick material (2) was directly fed (5) along with Portland clinker (4) on the mill (6), while the fine ones of anhydrous plaster were sent directly to the finished product (8). The milling was made giving time of approximately one hour so that the new material that entered cleaned the milling system. The resulting production of this one process was sent to a rejections hopper by means of deviation (7), taking samples at the beginning and at intervals of time from 1 hour for analysis. Later clinker and the anhydrous plaster were milling the necessary time in the presence of a milling additive for example Darex in a 0.03% in weight, until obtaining a refinement of mesh 325. The product obtained by this one process, presented the refinement indicated as minimum in a 99% and the characteristics indicated in FIG. 8 for the case of Portland cement:Anhydrite mixture 40:60, and in FIG. 12 for the case of mixtures 25:75 and 30:70 of Portland cement.

EXAMPLE 4

Determination of the Compressive Strength

The finished product resulting of the milling of example 3 was analyzed to determine its resistance to compression force according to norm ASTM C-109.

In a dry bowl equipped with a pallet on mixing position, was prepared a mixture for 9 buckets with 740 g of cement, 2035 g of Ottawa sand and 359 ml of water. Later the obtained mixture was put under a molding process for 2 minutes 30 seconds, at the same time the compartments of the molds were filled with a spoon up to half.

After filling to half the compartment, the mixture was tamped 32 times in 4 cycles, being made this in each compartment before happening to the following one. Each cycle consisted of tamping 8 times with the appropriate vertical angle and the sufficient pressure on the surface to assure the uniform filling of the compartment.

Later the mold was filled (to 25 mm height) and begins again to tamp the mixture. The molds were kept in a humid room with the superior part upwards, exposed outdoors but protected by dripping of 20–24 hrs. The buckets of the molds when completing 24 hrs were kept in a humid room. The buckets of 3, 7, and 28 days of age of rupture previously identified, were submerged in chronological order in a water sink with the identified face upwards. Once the age time of each respective bucket past, these were retired of the water sink and humid room (24 hrs), to prove their resistance in the compression machine. The weight application was made in a no smaller time of 20 seconds and a no greater time of 80 seconds. The rupture was made in the following order: buckets of 24 hrs, buckets of 3 days, buckets of 7 days and finally buckets of 28 days. Finally the obtained results are observed in FIG. 2.

EXAMPLE 5

Comparison of Physical Properties

Figure 2:
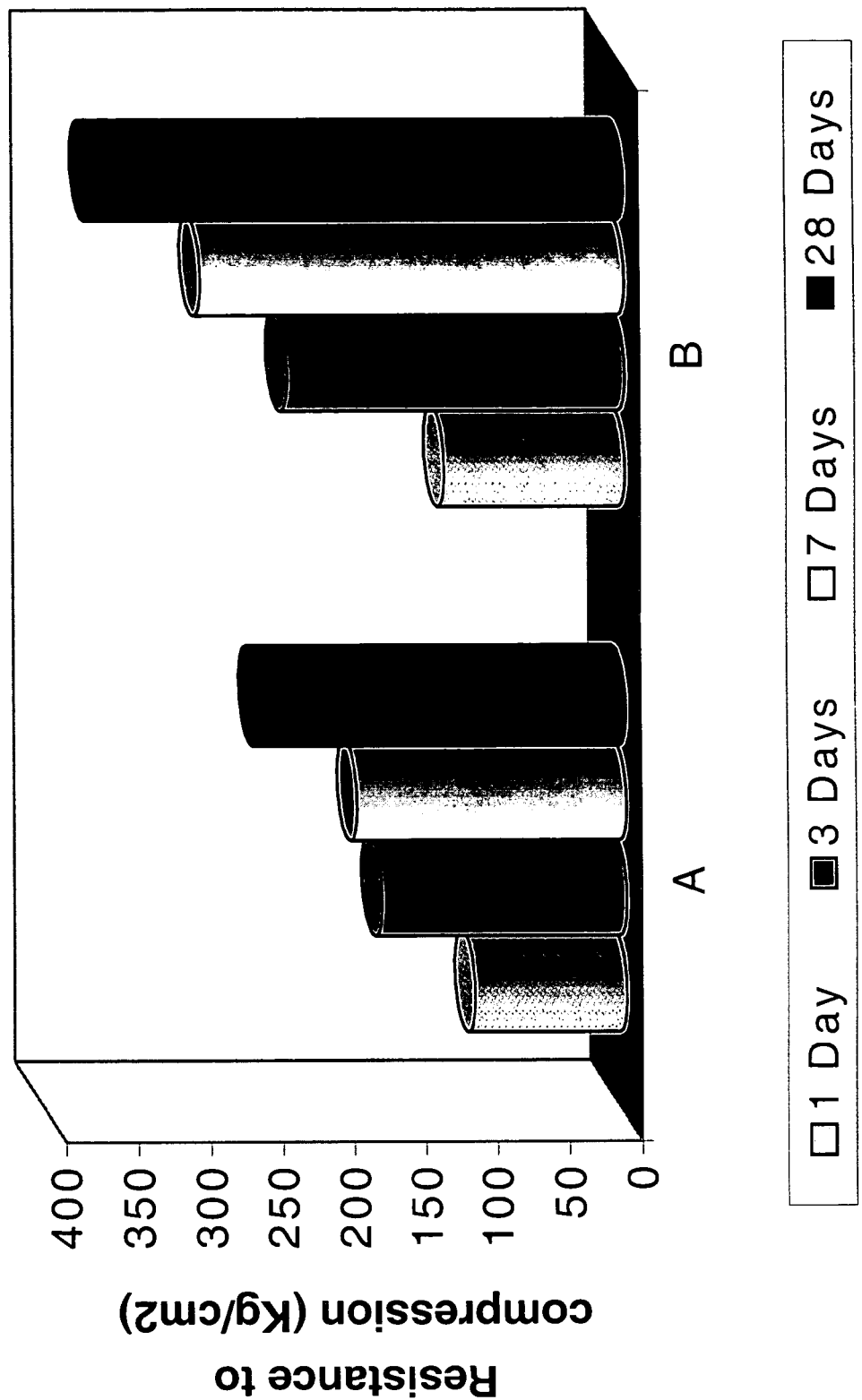
FIG. 2 is a comparative graph of resistance to compression (ASTM C-109) among cementitious mixture 40:60 of the invention (A) and Portland cement (B) to 1, 3, 7 and 28 days.
Figure 3:
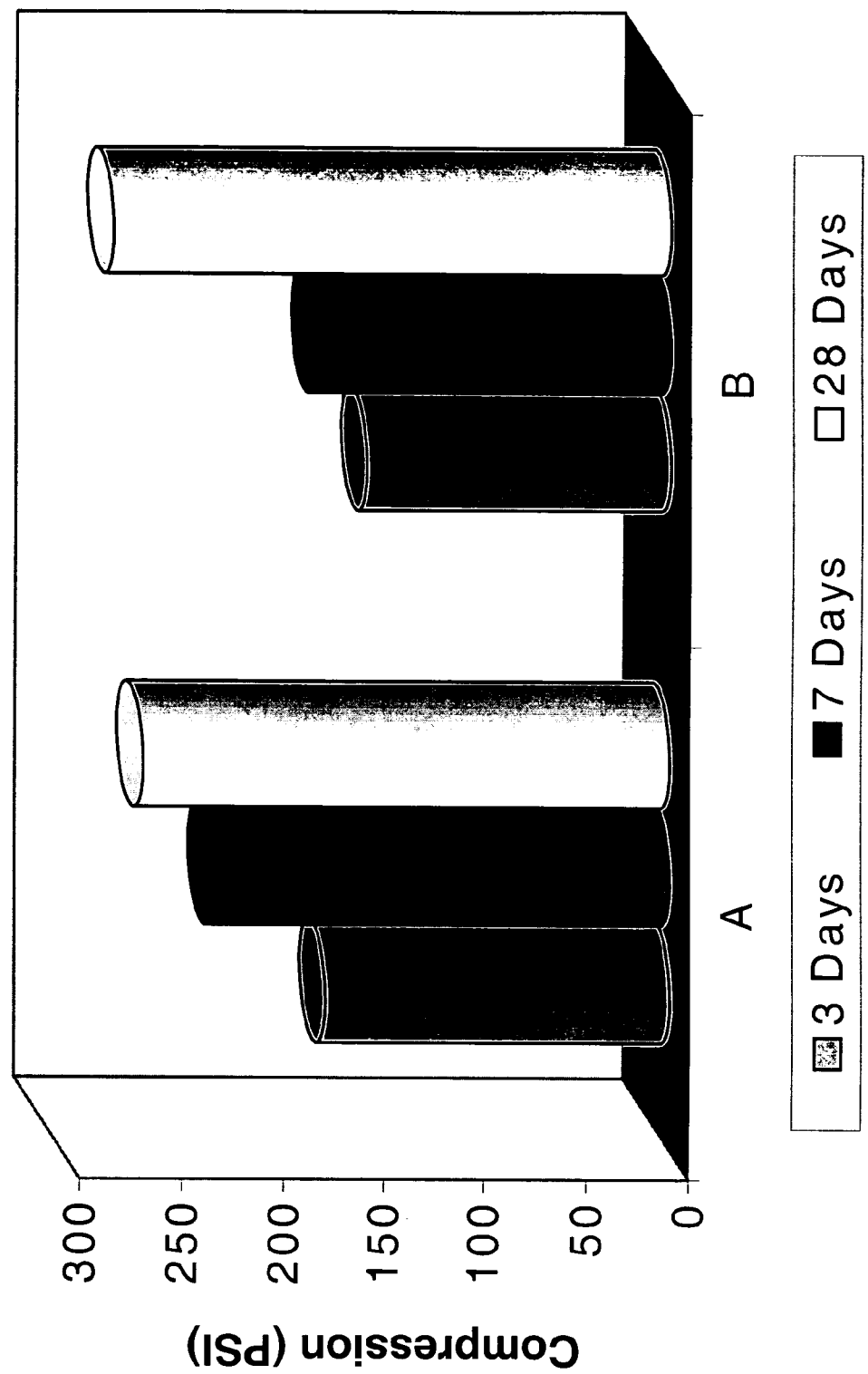
FIG. 3 is a comparative graph of resistance to compression in concrete (ASTM C-192) between concrete of a cementitious mixture 40:60 of the invention (A) and concrete f'c 250 (B) to 3, 7 and 28 days.

The physical characteristics of the cement compositions previously obtained with Portland cement were compared. As it can be observed in FIG. 3, the compressive force developed in concrete with the cement of the invention in proportion 40:60 of Portland cement:anhydrite, was greater to 3 and 7 days that the detected for Portland cement. In the case of the compression values obtained to 28 days, they were similar in both cements. These data indicated that the cementitious of the invention can reach resistance to compression force in early stages in similarity with the reached ones with the Portland cement; also, the resistance to compression force at early stages turns out to be superior to the observed one for the ordinary Portland cement. A similar behavior in early stages was observed in the test of resistance to compression (FIG. 2).

Of specific way for the same cementitious composition 40:60, the minimum compressive resistance observed in buckets of mortars was of 85 Kg/cm$^2$, 135 Kg/cm$^2$, 180 Kg/cm$^2$ and 250 Kg/cm$^2$ to 24 hr., 3, 7 and 28 days corresponding.

Figure 4:
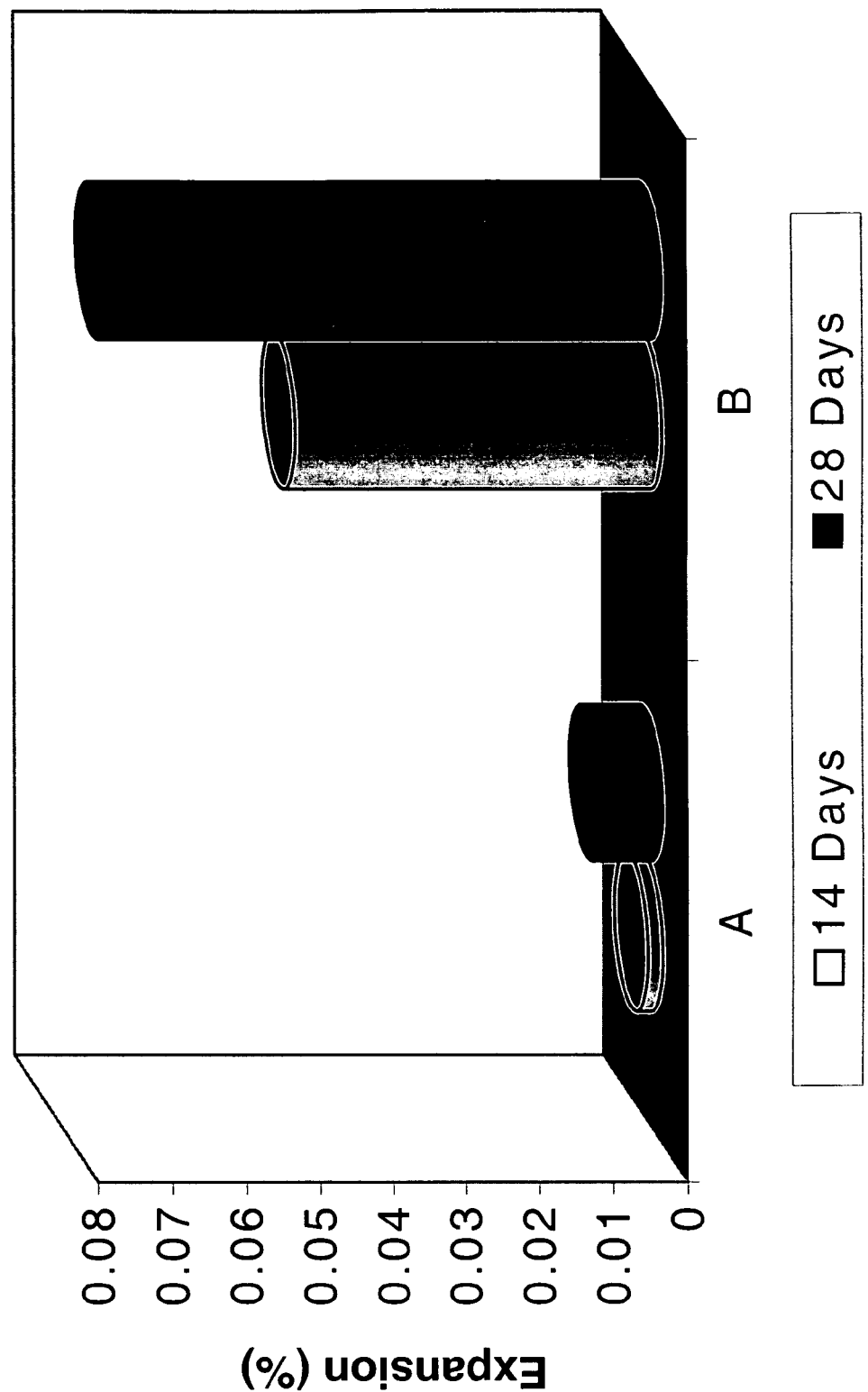
FIG. 4 is a comparative graph of expansion in water, of bars (ASTM C-1038) from the cementitious mixture 40:60 of the invention (A) and bars of Portland cement (B) to 14 and 28 days.

On the other hand, with the obtained cementitious 40:60 according to the invention, inferior values in percentage of water expansion were observed, using the methodology described according to norm ASTM C-1038. As it can be observed in FIG. 4, the values of expansion in water of Portland cement were superior with respect to the cementitious of the invention, at least 8 times higher.

On the other hand, the hydration heat of cement 40:60 of the invention was smaller to early stages (7 days) that the obtained for Portland cements type II and IV (see FIG. 5).

As it can be observed in FIG. 9, the percentage of change of length of mortar bars determined according to ASTM-1038 that is obtained with the cementitious compositions of the invention, turns out to be always inferior that the value obtained for anhydrite, reaching these only one third part of the value (see FIG. 9, mix 25:75) of anhydrite like maximum value. This characteristic is indicative of a much smaller capacity of expansion in the compositions of the invention in comparison with the detected one for anhydrite. For the case of the percentage of change of length of the Portland cement, it turned out to be comparable to the 7 days to the values obtained for mixtures 30:70 and 40:60 and to the 14 days to mixture 30:70; such results imply an important similarity in the expansion characteristics and resistance in the compositions of the invention with the observed ones for the Portland cement.

With relation to the resistance to abrasion, the compositions of the invention are more resistant to deterioration than conventional concrete (see FIG. 10). In this one case, the mixture 40:60 and 30:70 presented in all the cases a smaller deterioration than the observed one for the concrete.

In the determined times of setting for the compositions of the invention, in every case, initial and final times of setting were 5 to 10 times smaller (see FIG. 11) than the observed ones for Portland cement. This characteristic allows that the compositions of the invention can have a great variety of applications in the industry of the construction depending of the necessities on setting.

With respect to the cementitious compositions obtained in proportions 25:75 and 30:70 of Portland cement:anhydrite of the invention, the values obtained from compression resistance (see FIG. 12) showed values smaller than those observed for mixture 40:60. This characteristic is very convenient and advantageous for its application in areas where additional expansive cementitious compositions are required, for example in the elaboration of floors from industrial buildings. Derivative of these results, cementitious compositions of the invention can be versatile in their physical characteristics and therefore in their practical applications.

The refinement of milling for the cementitious compositions of the invention was determined according to ASTM C-204, obtaining a minimum value of 7000 g/cm$^2$, superior to the reported by Mehta[10] for clinkers of expansive sulphates (3000 and 5000 g/cm$^2$).

REFERENCES

1. Asbridge, Anthony Hales. 1999. Cementitious compositions and their uses. U.S. Pat. No. 5,958,131.
2. Klein, Alexander. 1964. Calcium aluminosulfate and expansive cements containing same. U.S. Pat. No. 3,155,526.
3. Halstead, Moore. 1962. J. Applied of Chemistry, vol. 12, 413–415.
4. Galer, Richard E. 1982. High early strength cement. U.S. Pat. No. 4,350,533.
5. Harris, Harry A. 1985. Cementitious composition. U.S. Pat. No. 4,494,990.
6. Stav, Elisha. 1997. Cementitious gypsum-containing compositions and materials made therefrom. U.S. Pat. No. 5,685,903.
7. Ortega, Raymond. 1987. Cementitious floor underlayment. U.S. Pat. No. 4,661,159.
8. Barger, Gregory S. 1998. Cementitious systems and methods of making the same. U.S. Pat. No. 5,788,762.
9. Industrial Química de México, S.A. de C.V. 2000. Mezcla de anhidrita con aditivo para mejorar la calidad del material de construcción. Patent application MX 2000-3021.
10. Mehta, Povindar K. 1974. High calcium sulfate expansive clinker. U.S. Pat. No. 3,857,714.

We claim:

1. A solid cement composition that controls ettringite formation, consisting of:
   a) Anhydrite in a percentage in weight with respect to the total weight of the composition from 15 to 85%, and
   b) A selected cementitious of the group that consists of Portland cement type-1, type-2, type-3, type-4, type-5, or mixtures of such, in a percentage in weight with respect to the total weight of the composition from 15 to 85%.

2. The cement composition of claim 1, wherein the anhydrite is in a percentage in weight with respect to the total weight of the composition from 25 to 75% and the cementitious is in a percentage in weight with respect to the total weight of the composition from 25 to 75%.

3. The cement composition of claim 2, wherein the anhydrite is in a percentage in weight with respect to the total weight of the composition from 40 to 75% and the cementitious is in a percentage in weight with respect to the total weight of the composition from 25 to 60%.

4. The cement composition of claim 3, wherein the anhydrite is in a percentage in weight with respect to the total weight of the composition from 60 to 75% and the cementitious is in a percentage in weight with respect to the total weight of the composition from 25 to 40%.

5. The cement composition of claim 4, wherein the anhydrite is in a percentage in weight with respect to the total weight of the composition of 60% and the cementitious is in a percentage in weight with respect to the total weight of the composition of 40%.

6. The cement composition of claim 4, wherein the anhydrite is in a percentage in weight with respect to the total weight of the composition of 70% and the cementitious is in a percentage in weight with respect to the total weight of the composition of 30%.

7. The cement composition of claim 4, wherein the anhydrite is in a percentage in weight with respect to the total weight of the composition of 75% and the cementitious is in a percentage in weight with respect to the total weight of the composition of 25%.

8. A cement composition that controls ettringite formation, consisting essentially of:
   a) Anhydrite in a percentage in weight with respect to the total weight of the composition from 15 to 85%,
   b) A selected cementitious of the group that consists of Portland cement type-1, type-2, type-3, type-4, type-5, or mixtures of such, in a percentage in weight with respect to the total weight of the composition from 15 to 85%, and
   c) a milling additive selected from the group consisting of triethanolamine, propylene glycol, an amine acetate salt, and an additive consisting of ethylene glycol, acetic acid, triethanolamine and diethanolamine, in a percentage in weight with respect to the total weight of the composition of no more than 0.5%.

9. The cement composition of claim 8 wherein the milling additive is an amine acetate salt.

10. A Portland cement composition comprising: anhydrite and Portland cement, wherein
   a) Sulphates are in a percentage in weight with respect to the total weight of the composition of no greater than 48%,
   b) CaO is in a percentage in weight with respect to the total weight of the composition of no greater than 60%,
   c) Alumina is in a percentage in weight with respect to the total weight of the composition of no greater than 3%,
   d) Hemi-hydrate Calcium sulphate is in a percentage in weight with respect to the total weight of the composition of no greater than 5 to 8% and
   e) Di-hydrate Calcium sulphate is in a percentage in weight with respect to the total weight of the composition of no greater than 1 to 4%.

11. The cement composition of claim 1, wherein the composition has a mesh fineness of 325 in a 80% as minimum.

12. The cement composition of claim 11 wherein the composition has a mesh fineness of 325 in a 99%.

13. The Portland cement composition of claim 10, wherein the composition comprises:

| Component | Percentage in weight with respect to the total weight of the composition (%) |
|---|---|
| $SiO_2$ | 8–11 |
| $Al_2O_3$ | 0–3 |
| $Fe_2O_3$ | 0–1.5 |
| CaO | 48–60 |
| MgO | 0–1.3 |
| $K_2O$ | 0–0.5 |
| $Na_2O$ | 0–0.2 |
| $SO_3$ | 30–40 |
| Free lime | 0–2. |

14. The cement composition of claim 13 wherein the composition has a mesh fineness of 325 in an 80% as minimum and a Blame value (g/cm$^2$) of 5000 as minimum.

15. The cement composition of claim 14 wherein the composition has a mesh fineness of 325 in a 99%.

16. The cement composition of claim 10, wherein the composition comprises:

| Component | Percentage in weight with respect to the total weight of the composition (%) |
|---|---|
| $SiO_2$ | 5–8 |
| $Al_2O_3$ | 0–2 |
| $Fe_2O_3$ | 0–2 |
| CaO | 40–48 |
| MgO | 0–2 |
| $K_2O$ | 0–1 |
| $Na_2O$ | 0–0.3 |
| $SO_3$ | 38–44 |
| Free lime | 0–2. |

17. The cement composition of claim 16 wherein the composition has a mesh fineness of 325 in an 80% as minimum and a Blaine value (g/cm$^2$) of 5000 as minimum.

18. The cement composition of claim 17 wherein the composition has a mesh fineness of 325 in a 99%.

19. The cement composition of claim 10, wherein the composition comprises:

| Component | Percentage in weight with respect to the total weight of the composition (%) |
|---|---|
| $SiO_2$ | 3–6 |
| $Al_2O_3$ | 0–2 |
| $Fe_2O_3$ | 0–2 |
| CaO | 31–47 |

-continued

| Component | Percentage in weight with respect to the total weight of the composition (%) |
|---|---|
| MgO | 0–2 |
| $K_2O$ | 0–1 |
| $Na_2O$ | 0–0.3 |
| $SO_3$ | 40–48 |
| Free lime | 0–2. |

20. The cement composition of claim 19 wherein the composition has a mesh fineness of 325 in an 80% as minimum and a Blame value (g/cm$^2$) of 5000 as minimum.

21. The cement composition of claim 20 wherein the composition has a mesh fineness of 325 in a 99%.

22. A method for the obtention of the cement composition of claim 1, wherein the method includes the steps of:
   a) separating fine material from the anhydrite material,
   b) milling a cementitious selected of the group that consists of Portland cement type- 1, type-2, type-3, type-4, type-5, or mixtures of such, in conjunction with the separated anhydrite material obtained in a) to a mesh fineness of 325, and
   c) mixing the fine material obtained in a) with the mixture obtained in b).

23. The method of claim 22, wherein the separation of the fine material from the anhydrite material is made by direct feeding to a particle separator.

24. The method of claim 23, wherein the anhydrite material is a remainder product of an industrial fluorhydric acid production method.

25. The method of claim 22, wherein the amount of aluminate in the anhydrite material and cementitious is no more than 15% by weight with respect to the total weight, and the amount of sulphate is from 45 to 90% by weight with respect to the total weight.

26. A method for the production of the cement compositions of claim 8, wherein the method includes the steps of:
   a) separating fine material from the anhydrite material,
   b) milling a cementitious comprising:
      1) Portland cement type-1, type-2, type-3, type-4, type-5 or mixtures of such,
      2) the separated anhydrite material obtained in a), and
      3) a milling additive selected from the group consisting of triethanolamine, propylene glycol, an amine acetate salt, and an additive consisting of ethylene glycol, acetic acid, triethanolamine and diethanolamine, in a percentage in weight with respect to the total weight of the composition of no more than 0.5%, to a mesh fineness of 325, and
   c) mixing the fine material obtained in a) with the mixture obtained in b).

27. The method of claim 26, wherein the milling additive is an amine acetate salt.

* * * * *